United States Patent
Qiu et al.

(10) Patent No.: US 8,798,095 B2
(45) Date of Patent: Aug. 5, 2014

(54) METHOD AND APPARATUS FOR CALL PROCESSING FOR SIP AND ISUP INTERWORKING

(75) Inventors: Chaoxin Qiu, Austin, TX (US); Richard L. Khan, San Ramon, CA (US); Lillian Dannenberg, Pflugerville, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1339 days.

(21) Appl. No.: 11/870,825

(22) Filed: Oct. 11, 2007

(65) Prior Publication Data

US 2009/0097471 A1  Apr. 16, 2009

(51) Int. Cl.
*H04L 12/66* (2006.01)
*H04L 29/06* (2006.01)

(52) U.S. Cl.
CPC .............. *H04L 69/08* (2013.01); *H04L 12/66* (2013.01)
USPC .......................................... 370/467; 370/352

(58) Field of Classification Search
CPC ................... H04L 69/08; H04L 12/66
See application file for complete search history.

(56) References Cited

U.S. PATENT DOCUMENTS

| 6,021,191 A * | 2/2000 | Ash et al. ................. 379/221.05 |
| 2002/0001302 A1* | 1/2002 | Pickett .......................... 370/352 |
| 2005/0105541 A1* | 5/2005 | Jain et al. ...................... 370/401 |
| 2006/0056419 A1 | 3/2006 | Eichler et al. |
| 2006/0165059 A1 | 7/2006 | Batni et al. |
| 2007/0177603 A1 | 8/2007 | Calme et al. |

OTHER PUBLICATIONS

G. Camarillo, A. B. Roach, J. Peterson, L. Ong. "Intergrated Services Digital Network (ISDN) User Part (ISUP) to Session Initiation Protocol (SIP) Mapping". IETF Standards Track: RFC 3398. Network Working Group. Nov. 2002.*
Camarillo, et al. RFC 3398, "[ISUP] to [SIP] Mapping".*
Qiu et al., "System for Improving Operations in an IMS Network", U.S. Appl. No. 11/733,060, filed Apr. 9, 2007, 22 pages.
Scott Hollenbeck, "E.164 Number Mapping for the Extensible Provisioning Protocol", Standard Tracks, RFC 4114 E.164, Jun. 2005, 17 Pages.

* cited by examiner

*Primary Examiner* — Luat Phung

(57) ABSTRACT

A system that incorporates teachings of the present disclosure may include, for example, a server having a controller to adjust a call processing logic for Session Initiated Protocol to Integrated Services Digital Network User Part (ISUP) calls based at least in part on interworking profiles assigned to ISUP trunk groups supporting the calls. Additional embodiments are disclosed.

21 Claims, 9 Drawing Sheets

METHOD AND APPARATUS FOR CALL PROCESSING FOR SIP AND ISUP INTERWORKING

FIELD OF THE DISCLOSURE

The present disclosure relates generally to communication techniques and more specifically to call processing for Session Initiated Protocol (SIP) and Integrated Services Digital Network (ISDN) User Part (ISUP) interworking.

BACKGROUND

In SIP based Voice over Internet Protocol (VoIP) networks, SIP-ISUP interworking units (often called Media Gateway Controller Functions, MGCF) are commonly used. The MGCF handles call processing functions and message translations between SIP messages in an Internet Protocol (IP) network and ISUP messages in a Public Switched Telephone Network (PSTN) network. Most MGCF products are implemented in compliance with standards such as IETF RFC 3398 or ANSI T1.679.

In accordance with SIP standards in an IP network, the MGCF follows specific call processing rules and call flows for SIP to ISUP calls. The call flows generally require the MGCF to wait for an Address Complete Message (ACM) response from the PSTN network. Upon receiving the ACM, the MGCF can process a status indicator in the ACM and respond to a SIP client with call status and progress. After responding to the SIP client, the MGCF can proceed to request, or cut, a media path to the PSTN network. The media path allows for delivery of media content to the SIP client from the PSTN network.

In accordance with ISUP standards in a PSTN network, however, the originating switch is required to cut a receive only (RECVONLY) media path immediately upon sending out an Initial Address Message (IAM) message. The media path is established immediately afterwards because some ISUP trunks send audio information back to the caller immediately after receiving the IAM message.

This aspect of cutting a RECVONLY media path in the PSTN network immediately after the sending out an IAM message conflicts with the call flow logic of SIP and produces an interworking incompatibility between SIP and ISUP. In particular, the waiting period associated with the processing of the ACM message per SIP standard in the IP network prevents early media from being received by the SIP client since a media path has not yet been cut to the PSTN network.

Accordingly, any messages transmitted by the PSTN network to the MGCF prior to the establishment of the media path may be dropped at the MGCF. These messages may not reach the SIP client. Under these circumstances, the caller may not be able to receive information from the network regarding the call attempt.

DETAILED DESCRIPTION

In one embodiment of the present disclosure, a server can have a controller to adjust a call processing logic for Session Initiated Protocol (SIP) to Integrated Services Digital Network User Part (ISUP) calls based at least in part on interworking profiles assigned to ISUP trunk groups supporting the calls.

In another embodiment of the present disclosure, a computer-readable storage medium comprising computer instructions to adjust call processing logic for an ISUP call on an ISUP trunk group to establish one-way media path from a Public Switched Telephone Network (PSTN) to an originating VoIP device according to interworking profiles assigned to ISUP trunk groups.

In another embodiment of the present disclosure, a method can involve adjusting call processing logic within a Media Gateway Controller Function for SIP to Public Switched Telephone Network (PSTN) calls based on interworking profiles assigned to ISUP trunk groups handling the SIP to PSTN calls.

Figure 1:
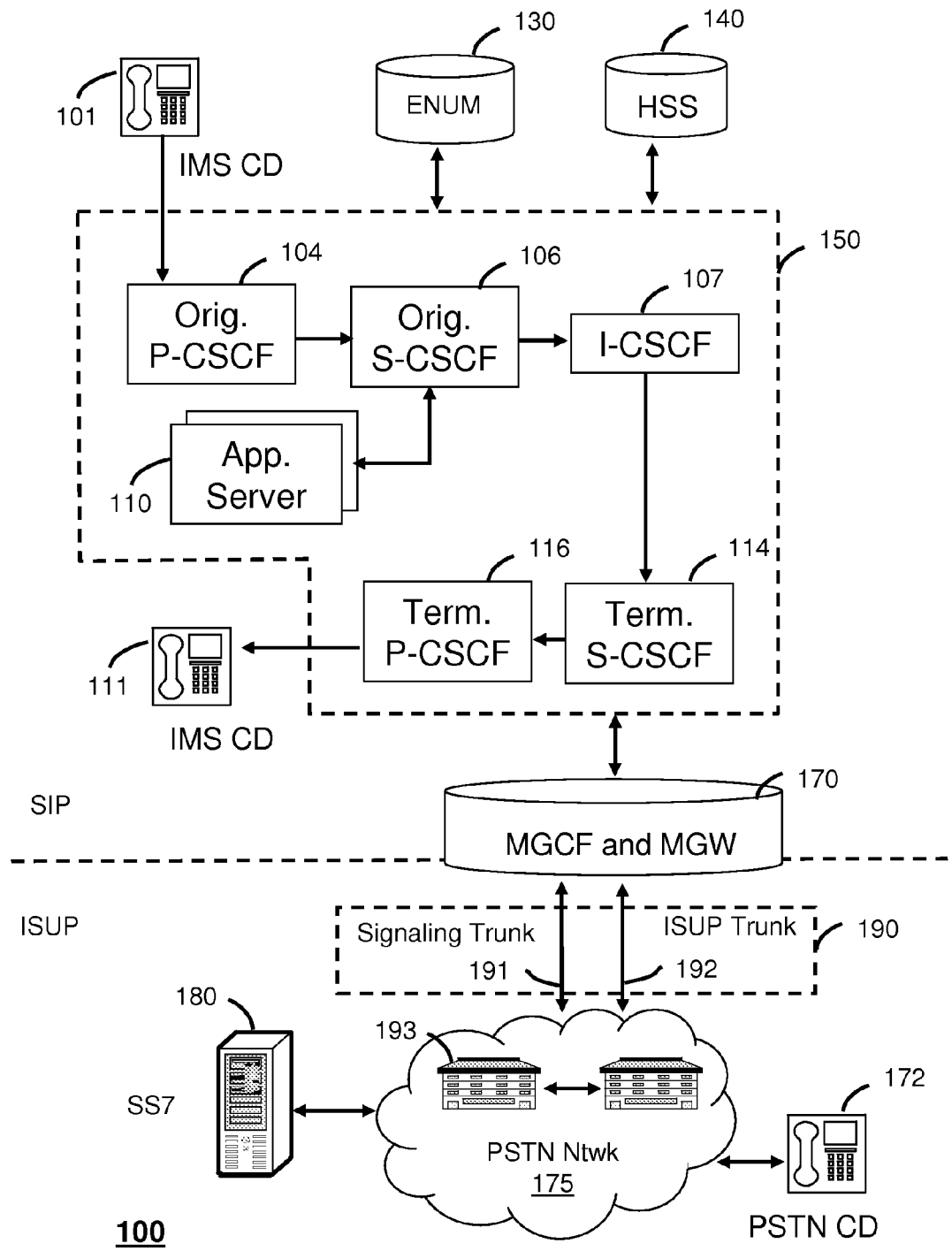
FIG. 1 depicts an exemplary embodiment of a communication system.

FIG. 1 depicts an exemplary communication system 100. The communication 100 can comprise a Home Subscriber Server (HSS) 140, a tElephone NUmber Mapping (ENUM) server 130, and common network elements of an Internet Protocol Media Subsystem (IMS) network 150. The IMS network 150 can be coupled to IMS communication devices (CDs) such as IMS-compliant phone 111 and IMS-compliant phone 101. The IMS-compliant phone 101 can be a VoIP device, or another internet media device which may be IMS-compliant.

Public Switched Telephone Network (PSTN) devices such as a PSTN phone 172 can be coupled to the IMS network 150 by way of a Media Gateway Control Function/Media Gateway (MGCF/MGW) 170 coupled to a PSTN network 175 through one or more MGCF/MGW to PSTN connections 190. The connection for the SIP to ISUP interworking of the MGCF/MGW to PSTN connections 190 can be dispersed throughout the PSTN network 175. The MGCF/MGW to PSTN connections 190 can include SS7 Signaling links 191 to the PSTN SS7 network 180 for signaling and ISUP trunk groups 192 to PSTN switches 193 for media communication. The PSTN SS7 network 180 separates information required to set up and manage telephone calls in the PSTN network 175 onto a separate packet switched network rather than using the same circuit switched network that telephone calls are made on for voice communication. The PSTN SS7 network 180 can provide telephony signaling to the PSTN network 175 for control of call setup and telephony feature processing, such as, providing caller ID, and sending a call-waiting tone, to name a few. An ISDN User Part (ISUP) can be part of the Signaling System 180 and can be used to set up telephone calls in the PSTN network 175.

Communications within the communication system 100 can conform to any number of signaling protocols such as a session initiation protocol (SIP), or a video communications protocol such as H.323 which combines video and voice over a packet-switched network, as well as cryptographic protocols, such as transport layer security (TLS) or secure sockets layer (SSL), to provide secure communications for data transfers. SIP is a signaling protocol for creating, modifying, and terminating sessions with one or more participants in the IMS network 150. It can be used to create two-party, multiparty, or multicast sessions that include Internet telephone calls, multimedia distribution, and multimedia conferences.

The MGCF/MGW 170 can conform to a media gateway control protocol (MGCP) also known as H.248 defined by the MEGACO work group in the Internet Engineering Task Force (IETF). This protocol can handle signaling and session management needed to control media processing resources in various media gateways and media servers. The protocol defines a means of communication that converts data from the format required for a circuit-switched network to that required for a packet-switched network. MGCP can therefore be used by MGCF as a device control protocol to set up, maintain, and terminate calls between multiple disparate network elements of the communication system 100. For example, the MGCP can be used between the MGCF and MGWs within MGCF/MGW 170. The MGCF/MGW 170 can therefore support hybrid communication environments for communication devices, including VoIP terminals.

To establish a communication session between devices, the IMS network 150 can utilize an Serving Call Session Control Function (S-CSCF) 106 and/or a Proxy Call Session Control Function (P-CSCF) 104. The originating S-CSCF 106 can submit queries to the ENUM server 130 to translate an E.164 telephone number to a SIP Uniform Resource Identifier (URI) if the targeted communication device is IMS compliant.

In the case where the ENUM server 130 returns a SIP URI, the SIP URI is used by an Interrogating CSCF (I-CSCF) 107 to submit a query to the HSS 140 to identify a terminating S-CSCF 114 associated with a targeted IMS communication device such as IMS CD 111. Once identified, the I-CSCF 107 can submit a SIP INVITE message to the terminating S-CSCF 114 which then identifies a terminating P-CSCF 116 associated with the targeted communication device. The P-CSCF 116 can then signal the communication device to establish communications. The aforementioned process can be in part symmetrical. Accordingly, the terms "originating" and "terminating" in FIG. 1 can be interchanged.

If the targeted communication device is a PSTN device such as reference 172, the ENUM server 130 will respond with an unsuccessful address resolution and the originating S-CSCF 106 will forward the call to the MGCF/MGW 170 which connects the call through the PSTN network 175 using common signaling means such as SS7. The MGCF/MGW 170 can provide interworking between SIP protocols on the IP side of the IMS network 150, and ISUP protocols on the PSTN side of the PSTN network 175. The MGCF/MGW 170 can link packet-switched and circuit-switched technologies such as the PSTN network 175 and the packet-based technologies of the IMS network 150.

In addition to the aforementioned network elements of the IMS network 150, there can be a number of application servers 110 which can provide a variety of services to IMS subscribers. For example, the application server 110 can be used to perform originating treatment functions on the calling party number received by the S-CSCF 106 in the SIP INVITE message. Originating treatment functions can include determining whether the calling party number has international calling services, and/or is requesting special telephony features (e.g., *72 forward calls, *73 cancel call forwarding, etc.).

Although not shown, a cellular network communicatively coupled to the PSTN network 175 and IMS network 150 can support voice and data services to communication devices with the communication system 100 over a number of access technologies such as GSM-GPRS, EDGE, CDMA-1X, UMTS, WiMAX, software defined radio (SDR), and other known and future technologies.

Figure 2:
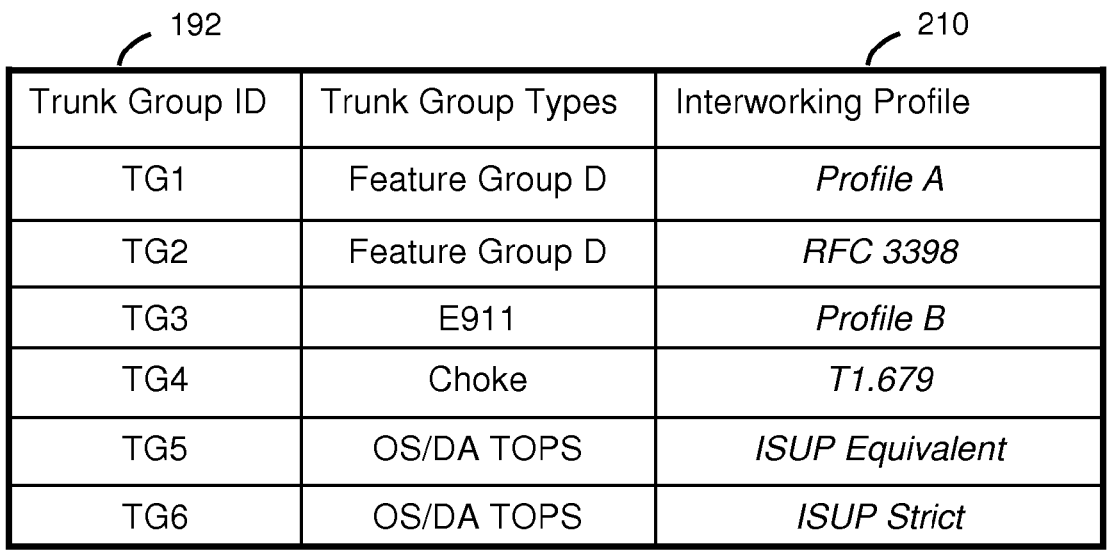
FIG. 2 depicts trunk group assignments in portions of the communication system.

FIG. 2 depicts an exemplary trunk group assignment record 200 for ISUP trunk groups 192 in portions of the communication system 100. Recall, the ISUP trunk groups 192 can comprise a portion of the MGCF/MGW to PSTN connections 190. In the exemplary illustration shown, each trunk group (TG) can be assigned an interworking profile 210 such as RFC3398, T1.679, ISUP_Strict, or ISUP_Equivalent. Other interworking profiles are also contemplated, for example, denoted by Profile A and Profile B as shown in FIG. 2. Each internetworking profile 210 can be associated with a specific call processing logic performed by the MGCF/MGW 170. As an example, MGCF/MGW 170 can assign TG2 to perform call processing logic in accordance with RFC 3398, TG3 to perform call processing logic in accordance to Profile B, and TG5 to perform call processing logic in accordance with ISUP_Strict.

Interworking profiles (e.g., ISUP_Strict and ISUP_Equivalent) can be assigned to trunk groups needing to establish one-way media paths to an originating VoIP device. The one-way media path allows an originating VoIP device to receive early media, if any needs to be provided to the originating VoIP device. Early Media is the ability for network to communicate call setup information (e.g., announcements) at an early stage of call setup (e.g., before ringing the called party.) Generally, ISUP_Strict and ISUP_Equivalent, introduce adjustments to the call processing logic associated with RFC3398 or T1.679. Interworking profiles ISUP_Strict and ISUP_Equivalent can circumvent processing of ACM messages on the IMS network 150 to expedite the cutting of a media path to the PSTN network 175. An ACM is a message returned from a terminating switch when the called party is reached and the phone starts ringing. In particular, the logic adjustment can include options for immediately cutting a receive only (RECVONLY) media path versus awaiting receipt of ACM messages. Trunk groups that do not need to receive early media can be assigned interworking profiles, such as 210 RFC3398 or T1.679, which are based on existing call processing logic, and which do not require modification.

Figure 3:
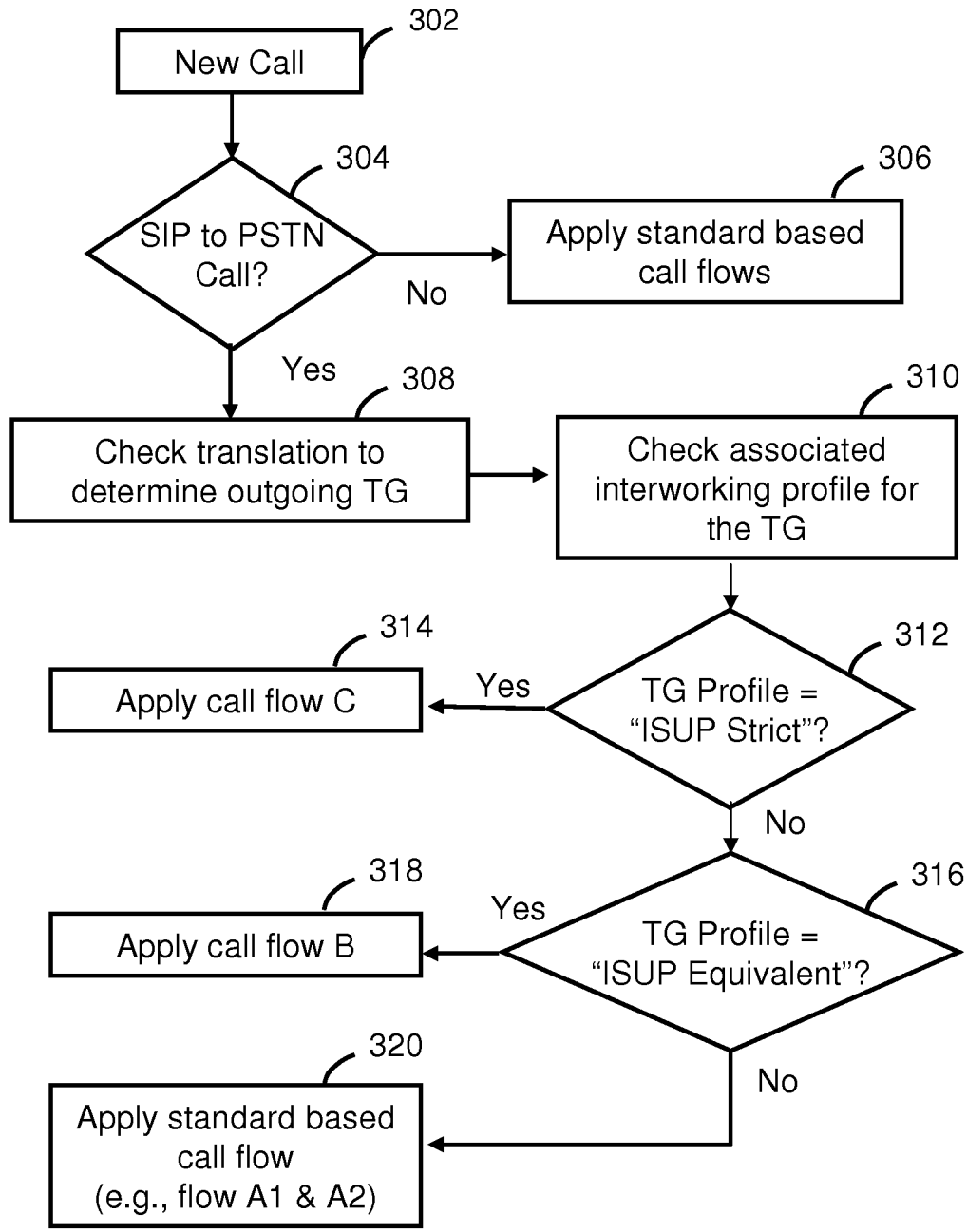
FIG. 3 depicts an exemplary flowchart of a method for assigning interworking profiles in the communication system.

FIG. 3 depicts a flowchart of an exemplary method 300 operating in the communication system 100. Method 300 is directed to determining an interworking profile assigned to a SIP to ISUP call. Method 300 begins with step 302 in which a new call is placed in the communication system 100, for example, by the IMS phone 101 to PSTN phone 172. At step 304, the MGCF/MGW 170 determines if the call is a SIP to ISUP call, for example, by examining SIP messages sent from the IMS phone 101 to the MGCF/MGW 170. If the call is not a SIP to ISUP call, the MGCF/MGW 170 applies standard based call flows at step 306. The standard based call flows perform call processing in accordance with requirements of the corresponding network supporting the call.

If however, the call is a SIP to ISUP call, the MGCF/MGW 170 checks SIP to ISUP translations to determine the outgoing ISUP trunk group, as shown at step 308. For example, the MGCF/MGW 170 can read SIP messages to determine which ISUP trunk groups 192 are requested. At step 310, MGCF/MGW 170 can then determine the interworking profile associated with the identified ISUP trunk group 192, for example, by checking trunk group assignment record 200 (See FIG. 2).

In one arrangement, the determination of the trunk group profile can be evaluated based on priority. For example, ISUP_Strict may require immediate establishment of a media path and thus be evaluated prior to trunk groups assigned to ISUP_Equivalent, as shown in the ordering of method step 312 and 316.

Accordingly, if at step 312, the interworking profile corresponds to ISUP_Strict, the MGCF/MGW 170 can apply at step 314 call processing logic associated with ISUP_Strict, for example Call Flow C, discussed later. Briefly, ISUP_Strict provides a one-way media path from the PSTN network 175 to the IMS phone 101 without having to wait for ACM messages received from the PSTN network 175. The one-way media path can be used to convey early media from components in the PSTN network 175 to the IMS phone 101. If however the interworking profile does not correspond to ISUP_Strict, but at step 316, corresponds to ISUP_Equivalent, the MGCF/MGW 170 can apply at step 318 call processing logic associated with ISUP_Equivalent, for example Call Flow B, discussed later. If the trunk group profile does not correspond to either ISUP_Strict or ISUP_Equivalent, the MGCF/MGW 170 can at step 320 apply standard call processing logic, such as Flow A1 & Flow A2 discussed later, which can correspond to RFC3398 and T1.679, respectively.

Notably, method 300 can adjust call processing logic in accordance with any interworking profile assigned to a trunk group, in addition to those shown in FIG. 3.

Figure 4:
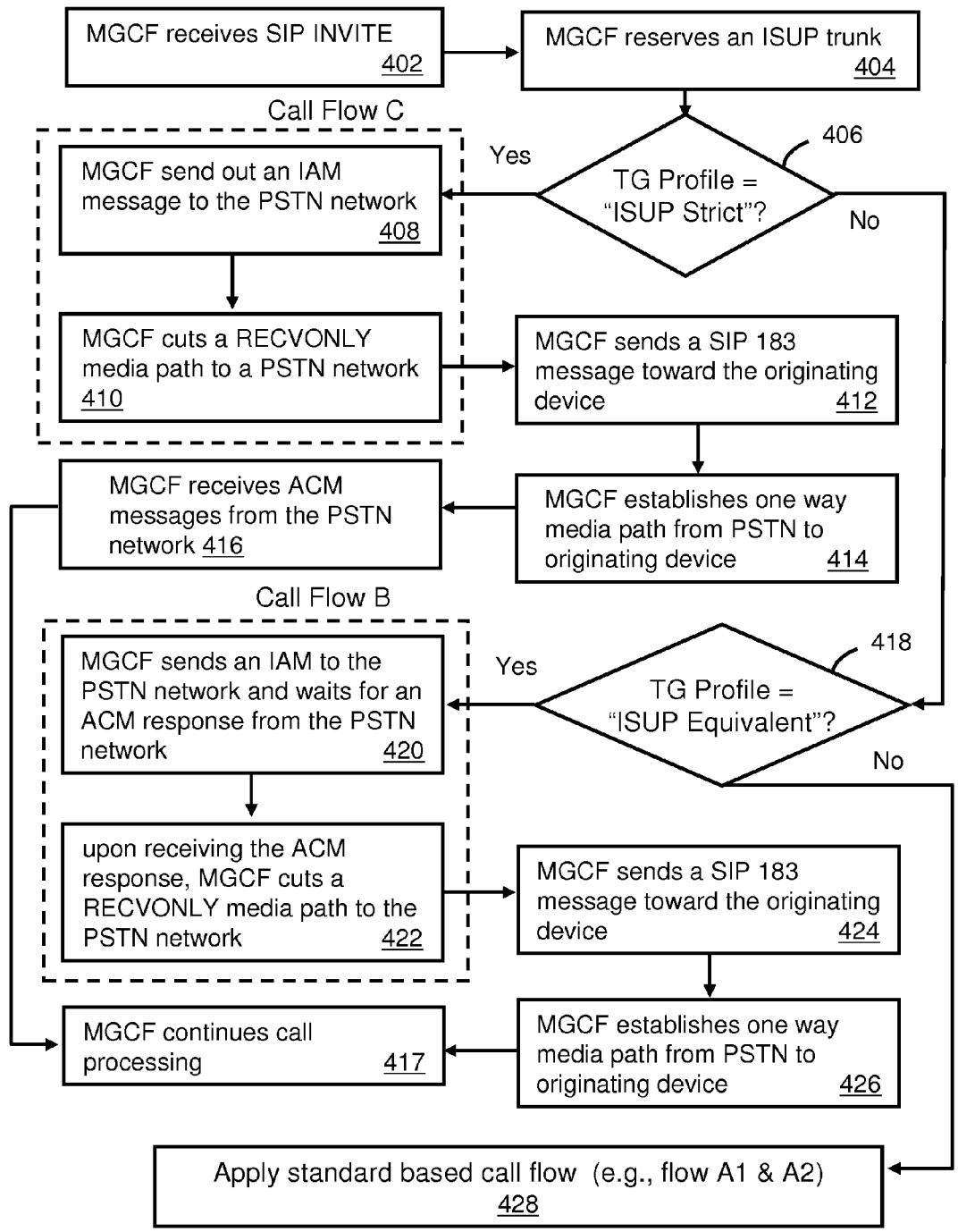
FIG. 4 depicts an exemplary flowchart of a method for call flow processing according to interworking profiles in the communication system.

FIG. 4 depicts a flowchart of an exemplary method 400 operating in the communication system 100. Method 400 is more specifically directed to adjusting call processing logic on an ISUP trunk group according to an interworking profile assigned to the ISUP trunk group. It should be noted, that method 400 is a more detailed flowchart to the flowchart of method 300 shown in FIG. 3. In particular, Call Flow C (corresponding to ISUP_Strict) and Call Flow B (corresponding to ISUP_Equivalent) are shown in greater detail, though any call flow according to an assigned interworking profile can apply. When discussing Method 400, reference will be made to call flows diagrams presented in FIGS. 5-8.

Method 400 begins at a state in which a Voice over IP (VoIP) client assumed for illustration purposes to be the IMS phone 101 initiates a new call to a PSTN client assumed for illustration purposes to be the PSTN phone 172. In step 402, the MGCF/MGW 170 receives the SIP INVITE generated in response to the call invoked by the IMS phone 101. The MGCF/MGW 170 can determine an ISUP trunk group 192 requested in the SIP INVITE. At step 404, the MGCF/MGW 170 can then reserve the corresponding trunk group 192. The MGCF/MGW 170 can then identify the interworking profile 210 of the reserved trunk group 192 from the trunk group assignment record 200 (See FIG. 2).

Figure 6:
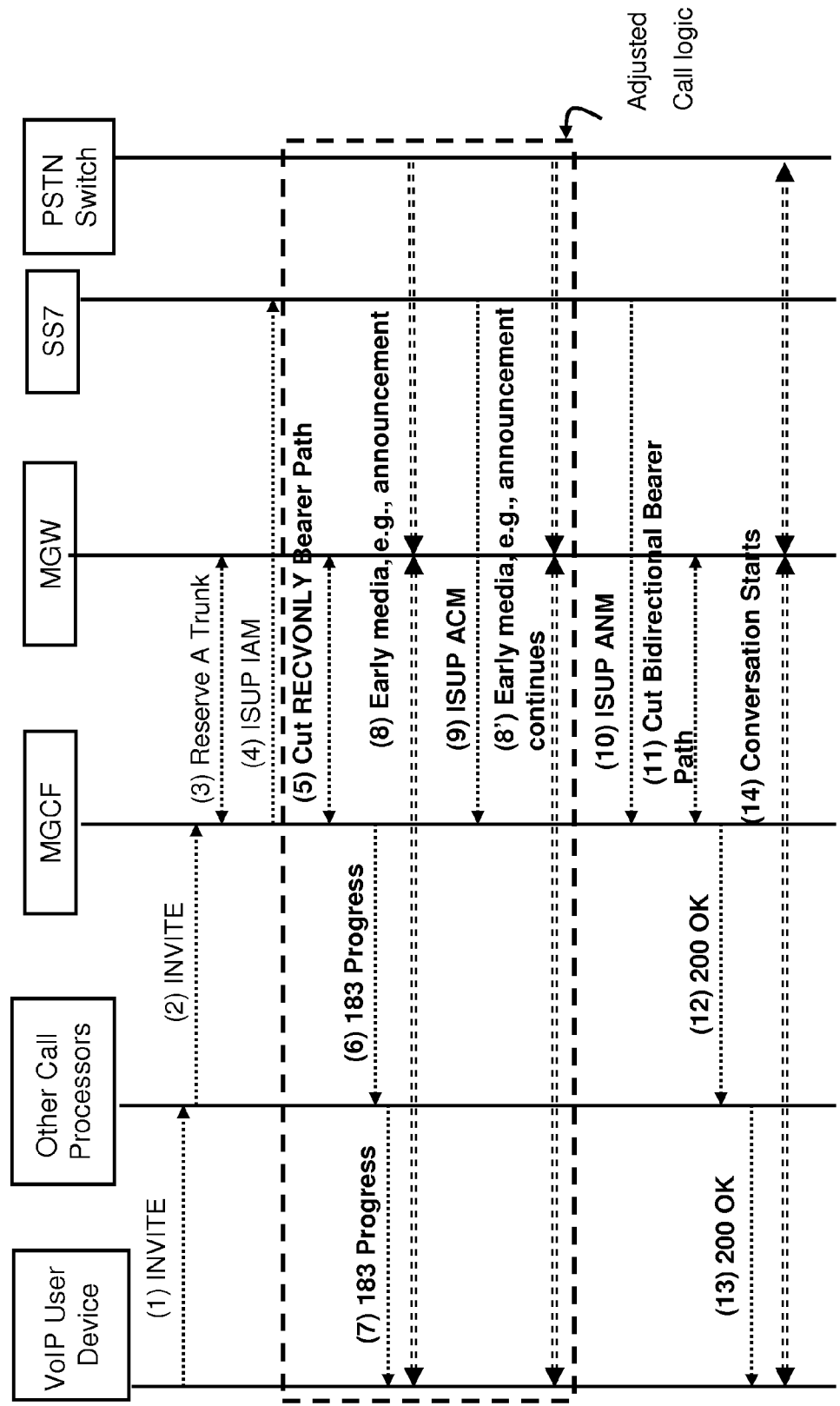

If at step 406 the interworking profile corresponds to ISUP_ Strict, then the MCGF 170 can adjust call processing logic according to ISUP_Strict. FIG. 6 depicts a call flow diagram 600 for "Call Flow C" for a SIP to ISUP call on an ISUP trunk group assigned to ISUP_Strict (adjusted call logic is shown in the dotted box). In particular, the MGCF/MGW 170 can send out an initial address message (IAM) to the PSTN network 175 responsive to receiving the SIP INVITE from the IMS phone 101. The IAM is the first message sent to inform the partner switch, that a call has to be established on the circuit code contained in the message. The IAM may contain the called party number in a mandatory part and may contain the calling party name and number in an optional part.

Returning back to FIG. 4, upon sending out the IAM at step 408, the MGCF/MGW 170 immediately can cut a RECVONLY media path to the PSTN network 175 as shown in step 410. This action requests a media path for receiving early media from the PSTN network 175. Upon the MGCF/MGW 170 at step 412, sending a SIP 183 session progress message toward the IMS phone 101, the MGCF/MGW 170 can establish a one-way media path from the PSTN network 175 to the IMS phone 101 at step 414. This permits the PSTN network 175 to provide early media to the IMS phone 101. For example, the PSTN network 175 can send an "AT&T Operator" announcement to the IMS phone 101, before connecting the call to an AT&T operator. As another example, the PSTN network 175 can send a branding message (e.g., "AT&T") to the IMS phone 101 while the PSTN phone 172 is ringing and before the user answers. At step 416 the MGCF/MGW 170 receives an ACM message from the PSTN network to continue call setup. At step 417, the MGCF/MGW 170 can continue call processing, for example, if the user answers the call and the call is connected.

The call processing flow associated with the ISUP_Strict profile is an adjustment to the call flow in RFC3398 or T1.679. Briefly, the call flow in RFC3398 or T1.679 can require that the MGCF/MGW 170 first check a status of the ACM message to evaluate a "subscriber free" indicator, and may or may not cut the RECVONLY media path upon receiving the ACM message. In this regard, the PSTN 175 would be prevented from sending messages before ringing the called party, since the media path is not yet established. Notably, the ISUP_Strict profile can adjust the call processing flow such that early media can be played before ACM messages are received from the PSTN network 175. The call processing adjustments associated with the ISUP_Strict profile can allow the MGCF/MGW 170 to establish a one-way media path, and convey early media before ACM messages are received, if needed.

Figure 5:
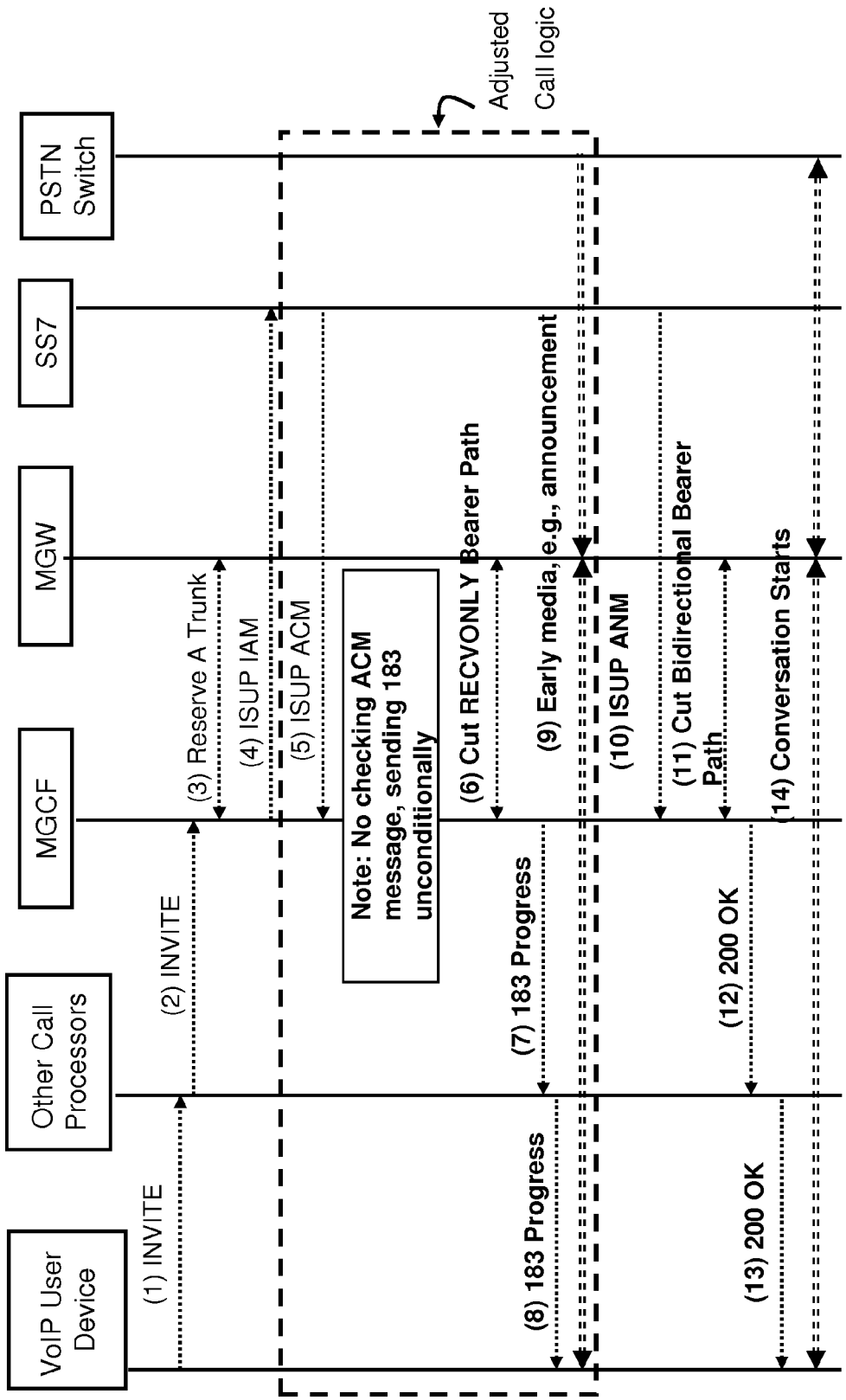
FIG. 5-6 depict call flow diagrams for call processing adjustments in the communication system.

If however at step 406, the interworking profile 210 does not correspond to ISUP_Strict, the MGCF at step 418 can determine if it corresponds to ISUP_Equivalent according to the steps described above. If so, MGCF/MGW 170 the MCGF 170 can adjust call processing logic according to ISUP_Equivalent. FIG. 5 depicts a call flow diagram 500 for "Call Flow B" for a SIP to ISUP call on an ISUP trunk group assigned to ISUP_Equivalent (adjusted call logic is shown in the dotted box). Returning back to FIG. 4, in step 420, the MGCF/MGW 170 can send an IAM message to the PSTN network 175 and can wait for an ACM response from the PSTN network. The ACM message indicates that the remote end of the ISUP trunk circuit has been reserved. Upon receiving the ACM response, MGCF/MGW 170 at step 422 can cut a RECVONLY media path to the PSTN network 175. It should be noted, that although the MGCF/MGW 170 waits for the ACM, it does not necessarily have to check the status of the ACM, for example, a "subscriber free" indicator in the SIP message. At step 424, after cutting the RECVONLY media path, the MGCF/MGW 170 sends SIP 183 session progress messages to the IMS phone 101. The MGCF/MGW 170 thus establish a one-way media path from the PSTN network 175 to the IMS phone 101 at step 426. At step 417, the MGCF/MGW 170 can continue call processing, for example, if the user answers the call and the call is connected.

The ISUP_Equivalent profile allows the call processing flow to be adjusted such that early media can be conveyed through the MGCF/MGW 170 to the IMS phone 101 without checking the ACM message received from the PSTN network 175. As mentioned previously, the call processing flow in RFC3398 or T1.679 require that the MGCF/MGW 170 first check a status of the ACM to evaluate a "subscriber free" indicator, and may or may not cut a RECVONLY media path upon receiving the ACM message. In contrast, the call processing adjustments associated with the ISUP_Equivalent profile allow the MGCF/MGW 170 to cut the RECVONLY media path immediately after receiving the ACM message without checking the ACM message. The call flow adjustments associated with the ISUP_Equivalent profile send 183 SIP messages unconditionally in response to receiving the ACM message; that is, without checking the ACM.

If on the other hand, the interworking profile 210 does not correspond to ISUP_Strict or ISUP_Equivalent at step 418, the MGCF/MGW 170 can apply at step 428 a standard based call processing logic, such as Call Flows A1 and A2, corresponding to RFC3398 and T1.679, respectively. (See "Call Flow A1" in FIG. 7, and "Call Flow A2" in FIG. 8.) It should be noted that Call Flows A1 and A2 can also be assigned to ISUP trunk groups that do not require early media to provide cost savings. Although adjustments are not made to the call logic processes of Call Flows A1 and A2, the determination of an interworking profile associated with these call flows at step 428 is warranted.

Figure 7:
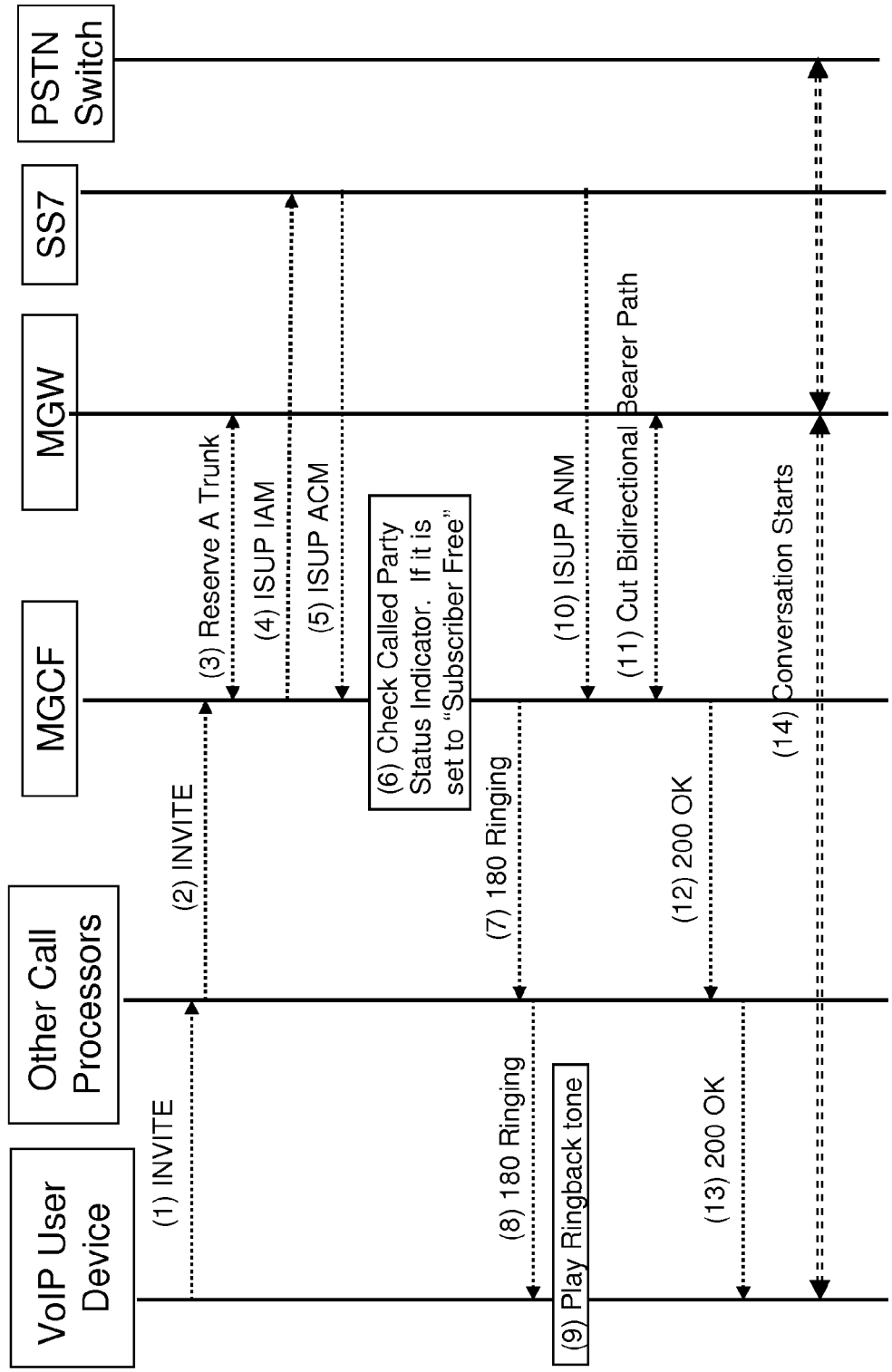
FIG. 7-8 depict call flow diagrams for call processing in the communication system.

In Call Flow A1, as shown in FIG. 7, the MGCF/MGW 170 can check a called party status indicator (e.g., "subscriber free") in the ACM message. If the called party status indicates that the subscriber is free, MGCF/MGW 170 can send a SIP 180 ringing message to the IMS phone 101 to cause the IMS phone 101 to play ring-back tones locally; that is, on the IMS phone 101 using its own media processing resources.

Figure 8:
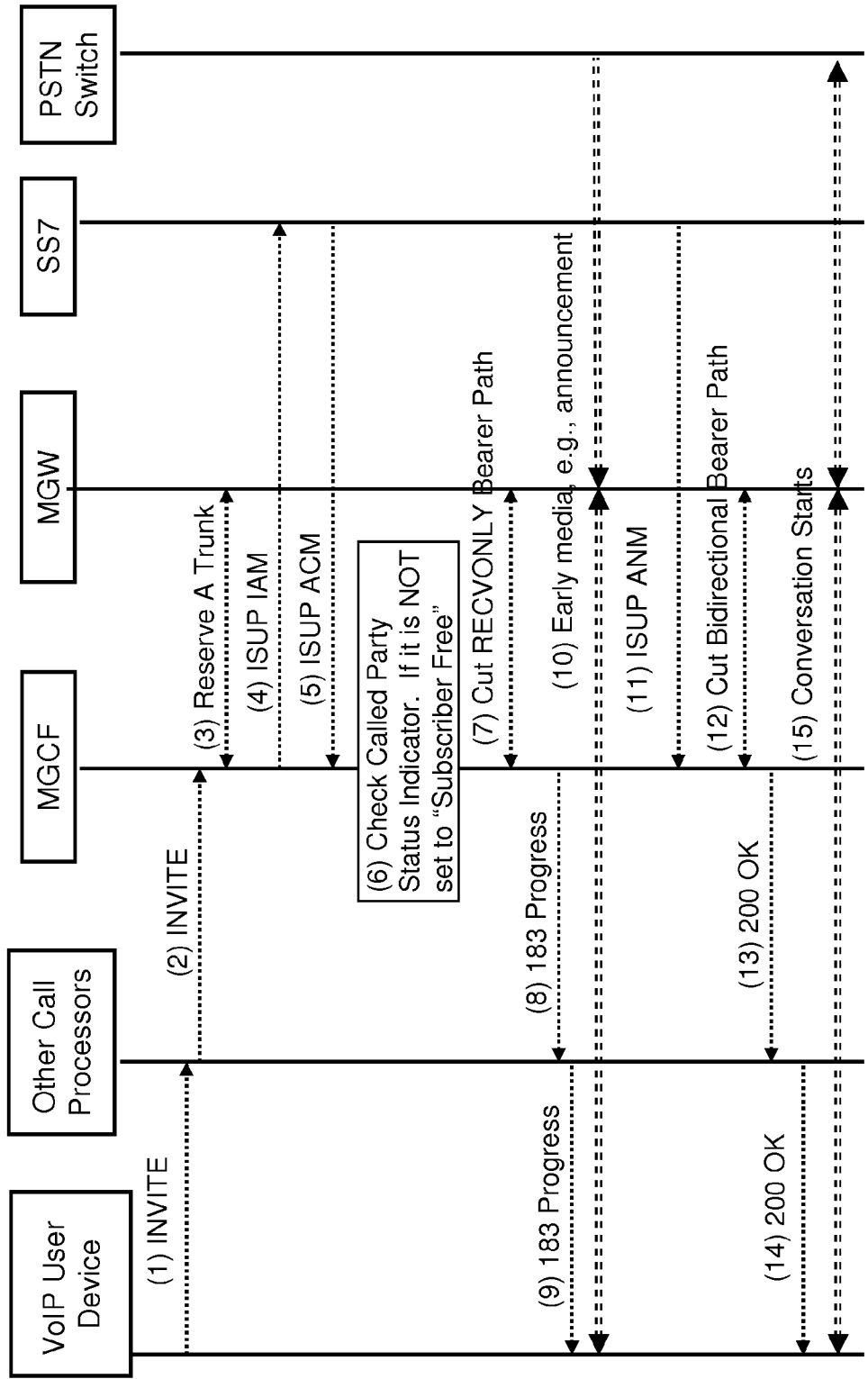

In Call Flow A2, as shown in FIG. 8, if the called party status indicator is not set to "subscriber is free", MGCF/MGW 170 can send a SIP 183 message to the IMS phone 101. Call Flow A2, similar to call flow B and C, requires use of media gateway resources, for example access to a digital signal processor (DSP) to convert out-of-band signaling to in-band signaling, which consumes computational resources.

At step 428 of FIG. 4, the MGCF/MGW 170 applies either Call Flow A1 or Call Flow A2 in accordance with the current network requirements, to allow offloading of resources to the IMS phone 101. This allows the media gateway to conserve resources when early media is not required as in Call Flow A1, instead of applying Call Flow B or C. Accordingly, the assignment of interworking profiles to ISUP trunk groups as discussed herein allows most ISUP trunks to continue to follow VoIP standards (e.g. Call Flow A1) for cost savings, but allows other ISUP trunks to be configured differently (e.g. Call Flow B and C) if there is a need for providing early media to the caller.

Upon reviewing the aforementioned embodiments, it would be evident to an artisan with ordinary skill in the art that said embodiments can be modified, reduced, or enhanced without departing from the scope and spirit of the claims described below. As an example, other types of call logic or adjustments to the existing call logic can be utilized or implemented based upon other interworking profiles assigned to the trunk groups, including applying different protocols or standards. Additionally, the interworking profiles associated with the trunk groups can be configured in various ways. For example, a first interworking profile can be assigned to a first group of trunk groups for signaling trunks, while a second interworking profile can be assigned to a second group of trunk groups for voice trunks.

These are but a few examples of modifications that can be applied to the present disclosure without departing from the scope of the claims. Accordingly, the reader is directed to the claims section for a fuller understanding of the breadth and scope of the present disclosure.

Figure 9:
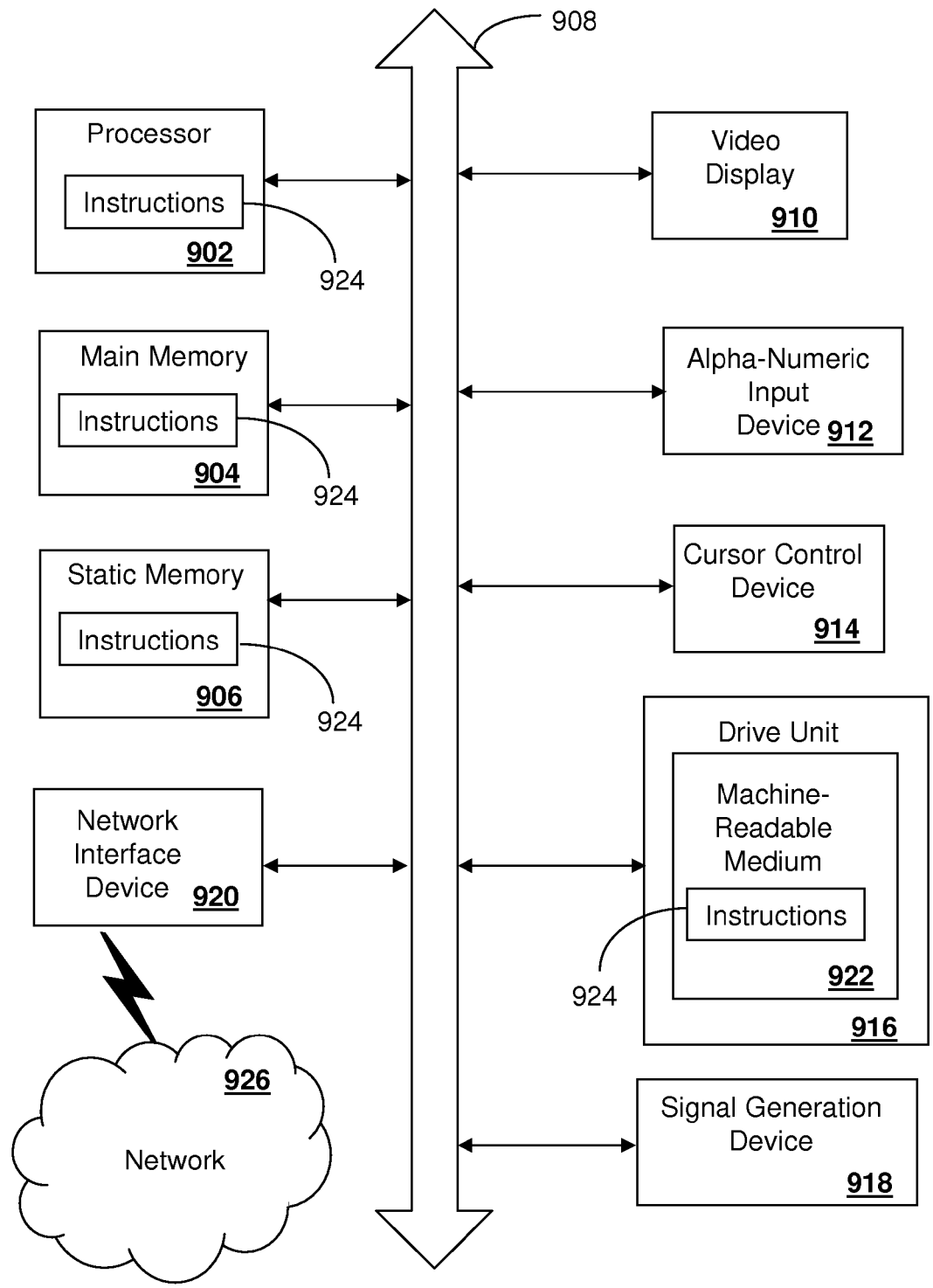
FIG. 9 depicts an exemplary diagrammatic representation of a machine in the form of a computer system within which a set of instructions, when executed, may cause the machine to perform any plurality of the methodologies disclosed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
a processor; and
a computer-readable medium storing instructions which, when executed by the processor, cause the processor to perform operations, the operations comprising:
adjusting a call processing logic for a session initiation protocol to integrated services digital network user part call based on an interworking profile assigned to an integrated services digital network user part trunk group that is selected to support the call, wherein the adjusting comprises selecting, based on the interworking profile, between establishing a one-way media path to an originating device upon a receipt of the call from the originating device and awaiting a receipt of an address complete message, wherein the one-way media path comprises a receive only media path, wherein the integrated services digital network user part trunk group that is selected to support the call is one of a plurality of different integrated services digital network user part trunk groups that are assigned different interworking profiles, wherein each of the different interworking profiles specifies a different call handling for session initiation protocol to integrated services digital network user part calls; and
establishing the one-way media bath comprising a one-way media bath from a public switched telephone network to the originating device without checking the address complete message returned from the public switched telephone network associated with the integrated services digital network user part trunk group.

2. The server of claim 1, wherein the operations further comprise:
receiving a directive to assign an interworking profile conforming to a Request for Comments as defined by Internet Engineering Task Force.

3. The server of claim 1, wherein the interworking profile conforms to an integrated services digital network user part to session initiation protocol mapping defined in RFC3398.

4. The server of claim 1, wherein the integrated services digital network user part trunk group comprises a media gateway to public switched telephone network connection.

5. The server of claim 1, wherein the operations further comprise:

cutting the one-way media path comprising a receive only media path to the public switched telephone network responsive to receiving a session initiation protocol INVITE from the originating device and after sending out an initial address message to the public switched telephone network; and sending a session initiation protocol session progress message toward the originating device responsive to cutting the receive only media path.

6. The server of claim 5, wherein the operations further comprise:

checking the address complete message from the public switched telephone network only after sending the session initiation protocol progress message and establishing the receive only media path.

7. The server of claim 1, wherein the operations further comprise:

responsive to receiving a session initiation protocol invite from the originating device, sending an initial address message to the public switched telephone network;

upon receiving the address complete message, cutting the one-way media path comprising the receive only media path to the public switched telephone network; and sending a session initiation protocol progress message toward the originating device responsive to cutting the receive only media path.

8. The server of claim 7, wherein the session initiation protocol progress message is sent unconditionally.

9. The server of claim 1, wherein the interworking profile indicates to not modify the call processing logic when the interworking profile comprises a RFC3398 interworking profile.

10. The server of claim 9, wherein the operations further comprise:

sending a session initiation protocol ringing message upon receiving the address complete message from a public switched telephone network associated with the integrated services digital network user part trunk group to direct the originating device to play a ring back locally.

11. The server of claim 9, wherein a voice over internet protocol network supports the call.

12. A tangible computer-readable storage medium storing instructions which, when executed by a processor, cause the processor to perform operations, the operations comprising:

adjusting a call processing logic for a session initiation protocol to integrated services digital network user part call based on an interworking profile assigned to an integrated services digital network user part trunk group that is selected to support the call, wherein the adjusting comprises selecting, based on the interworking profile, between establishing a one-way media path to an originating device upon a receipt of the call from the originating device and awaiting a receipt of an address complete message, wherein the one-way media path comprises a receive only media path, wherein the integrated services digital network user part trunk group that is selected to support the call is one of a plurality of different integrated services digital network user part trunk groups that are assigned different interworking profiles, wherein each of the different interworking profiles specifies a different call handling for session initiation protocol to integrated services digital network user part calls; and establishing the one-way media path comprising a one-way media path from a public switched telephone network to the originating device without checking the address complete message returned from the public switched telephone network associated with the integrated services digital network user part trunk group.

13. The tangible computer-readable storage medium of claim 12, wherein the interworking profile conforms to an integrated services digital network user part to session initiation protocol mapping defined in RFC3398.

14. The tangible computer-readable storage medium of claim 12, wherein the operations further comprise:

adjusting the call processing logic to cut the one-way media path comprising a receive only media path to the public switched telephone network after sending out an initial address message to the public switched telephone network responsive to receiving a session initiation protocol invite from the originating device.

15. The tangible computer-readable storage medium of claim 14, wherein the operations further comprise:

sending a session initiation protocol progress message to the originating device responsive to cutting the receive only media path.

16. The tangible computer-readable storage medium of claim 12, wherein the operations further comprise adjusting the call processing logic to:

send an initial address message to the public switched telephone network responsive to receiving a session initiation protocol invite from the originating device; and upon receiving the address complete message, cut the one-way media path comprising a receive only media path to the public switched telephone network.

17. The tangible computer-readable storage medium of claim 16, wherein the operations further comprise:

sending a session initiation protocol progress message to the originating device responsive to cutting the receive only media path.

18. A method, comprising:

adjusting, by a processor, a call processing logic within a media gateway control function for a session initiation protocol to public switched telephone network call based on an interworking profile assigned to an integrated services digital network user part trunk group that is selected to handle the call, wherein the adjusting comprises selecting, based on the interworking profile, between establishing a one-way media path to an originating device upon a receipt of the call from the originating device and awaiting a receipt of an address complete message, wherein the one-way media path comprises a receive only media path, wherein the integrated services digital network user part trunk group that is selected to support the call is one of a plurality of different integrated services digital network user part trunk groups that are assigned different interworking profiles, wherein each of the different interworking profiles specifies a different call handling for session initiation protocol to integrated services digital network user part calls; and establishing, by the processor, the one-way media path comprising a one-way media path from a public switched telephone network to the originating device without checking the address complete message returned from the public switched telephone network associated with the integrated services digital network user part trunk group.

19. The method of claim 18, wherein the interworking profile conforms to an integrated services digital network user part to session initiation protocol mapping defined in RFC3398, and wherein the method further comprises sending a ringing message upon receiving the address complete message from a public switched telephone network associated with the integrated services digital network user part trunk group to direct the originating device to play a ring back locally.

20. The method of claim 18, further comprising:
sending an initial address message to a public switched telephone network associated with the integrated services digital network user part trunk group responsive to receiving a session initiation protocol invite message from the originating device;
upon receiving the address complete message cutting the one-way media path comprising the receive only media path to the public switched telephone network;
sending a progress message toward the originating device responsive to cutting the receive only media path to the public switched telephone network; and
playing an early media without checking the address complete message received from the public switched telephone network.

21. The method of claim 18, further comprising:
cutting the one-way media path comprising a receive only media path to a public switched telephone network associated with the integrated services digital network user part trunk group after sending out an initial address message to the public switched telephone network responsive to receiving a session initiation protocol INVITE message from the originating device; and
sending a session initiation protocol progress message toward the originating device responsive to sending out the initial address message to the public switched telephone network.

* * * * *